United States Patent [19]

Iwamatsu et al.

[11] Patent Number: 5,130,585
[45] Date of Patent: Jul. 14, 1992

[54] HOLLOW SHAFT MOTOR

[75] Inventors: Noboru Iwamatsu; Yuichi Endo, both of Yamanashi, Japan

[73] Assignee: Fanuc Ltd., Yamanashi, Japan

[21] Appl. No.: 601,781

[22] PCT Filed: Mar. 2, 1990

[86] PCT No.: PCT/JP90/00275
§ 371 Date: Oct. 31, 1990
§ 102(e) Date: Oct. 31, 1990

[87] PCT Pub. No.: WO90/10970
PCT Pub. Date: Sep. 20, 1990

[30] Foreign Application Priority Data
Mar. 6, 1989 [JP] Japan .................. 1-52140

[51] Int. Cl.$^5$ .................. H02K 9/08; H02K 7/06; H02K 7/10; H02K 1/32
[52] U.S. Cl. .................. 310/59; 310/52; 310/80; 310/61
[58] Field of Search .................. 310/52, 58, 59, 61, 310/80, 75 D; 74/424.8 R, 89.15; 192/141

[56] References Cited

U.S. PATENT DOCUMENTS

| 3,278,774 | 10/1966 | Roller et al. | 310/80 |
| 3,402,308 | 9/1968 | Henschke | 310/80 |
| 3,829,726 | 8/1974 | Nilsson | 310/52 |
| 4,586,394 | 5/1986 | Perkins | 74/424.8 R |

FOREIGN PATENT DOCUMENTS

| 50-118203 | 9/1975 | Japan . |
| 52-129907 | 10/1977 | Japan . |
| 57-168974 | 10/1982 | Japan . |
| 63-111361 | 5/1988 | Japan . |

Primary Examiner—Steven L. Stephan
Assistant Examiner—C. LaBalle
Attorney, Agent, or Firm—Armstrong, Nikaido, Marmelstein, Kubovcik & Murray

[57] ABSTRACT

A hollow shaft motor which has a ball screw shaft (24) passed therethrough and which drives the ball screw shaft (24) to rotate, wherein provision is made for flow paths (28, 30, 32) for passing compressed air for cooling purposes to one end of the motor so that the heat generated by the motor is not conducted to the ball screw shaft (24) through the ball nut (22) attached to one end of the cylindrical shaft (20) of the through type motor and engaged with the ball screw shaft.

6 Claims, 1 Drawing Sheet

HOLLOW SHAFT MOTOR

TECHNICAL FIELD

The present invention relates to a hollow shaft motor through which is passed a ball screw shaft attached to a driven body and which drives that boll screw shaft, more particularly relates to a hollow shaft motor which enables cooling by a gas.

BACKGROUND ART

In the past, when driving machine tool tables and other driven bodies by a ball screw shaft and ball nut mechanism, the ball nut is attached to the driven body and the ball screw shaft is connected through a coupling etc. to the output shaft of the motor positioned at one end of the ball screw shaft. With this structure, however, it is not possible to make the apparatus compact as a whole and further it is difficult to make the force act on the center of gravity of the driven body. Therefore, a so-called hollow shaft motor has been proposed in which a ball nut is attached to the motor and a ball screw shaft is passed through the motor.

The ball screw shaft and ball nut, however, are susceptible to heat conducted from the motor, which is a heat generating body, and suffer from heat expansion, which has a detrimental effect on the ball screw shaft and ball nut mechanism, for which high precision operation is required. Further, a ball nut is attached to one end of a cylindrical shaft through which the ball screw shaft is passed. Consequently, the ball screw shaft and the cylindrical shaft form between them a bag with one end closed, so there is the problem that it is difficult to radiate away the heat.

DISCLOSURE OF THE INVENTION

Therefore, the present invention has as its object the resolution of the above problem by providing a hollow shaft motor having a cooling mechanism for the ball screw shaft and ball nut mechanism.

In view of the above object, the present invention provides a hollow shaft motor having a cylindrical shaft which has a ball screw shaft passed therethrough and which fixes a rotor at an outer circumference of a predetermined position in the longitudinal direction, one end of said shaft having a ball nut attached thereto, the ball nut being threaded together with the ball screw shaft, the hollow shaft motor characterized in that provision is made of a hole for introducing cooling gas into a motor housing at the side of a stator attached to the motor housing near to the ball nut and in that provision is made of other holes for introducing cooling gas in the cylindrical shaft in substantially the radial direction at the same side of the rotor opposing the stator, these being communicated with the bore of the cylindrical shaft.

The cooling medium is introduced from an introducing hole provided in the housing to the inside of the motor so as to cool the stator and rotor. Further, the cooling air is led from the other introducing holes provided in the cylindrical shaft to the inside of the cylindrical shaft to cool the ball screw shaft. On the other hand, the above-mentioned introducing holes are provided at the side of the stator and rotor near to the ball nut, so heat generated by the stator and rotor are blocked from being conducted to the ball nut.

BEST MODE FOR CARRYING OUT THE INVENTION

Figure 1:
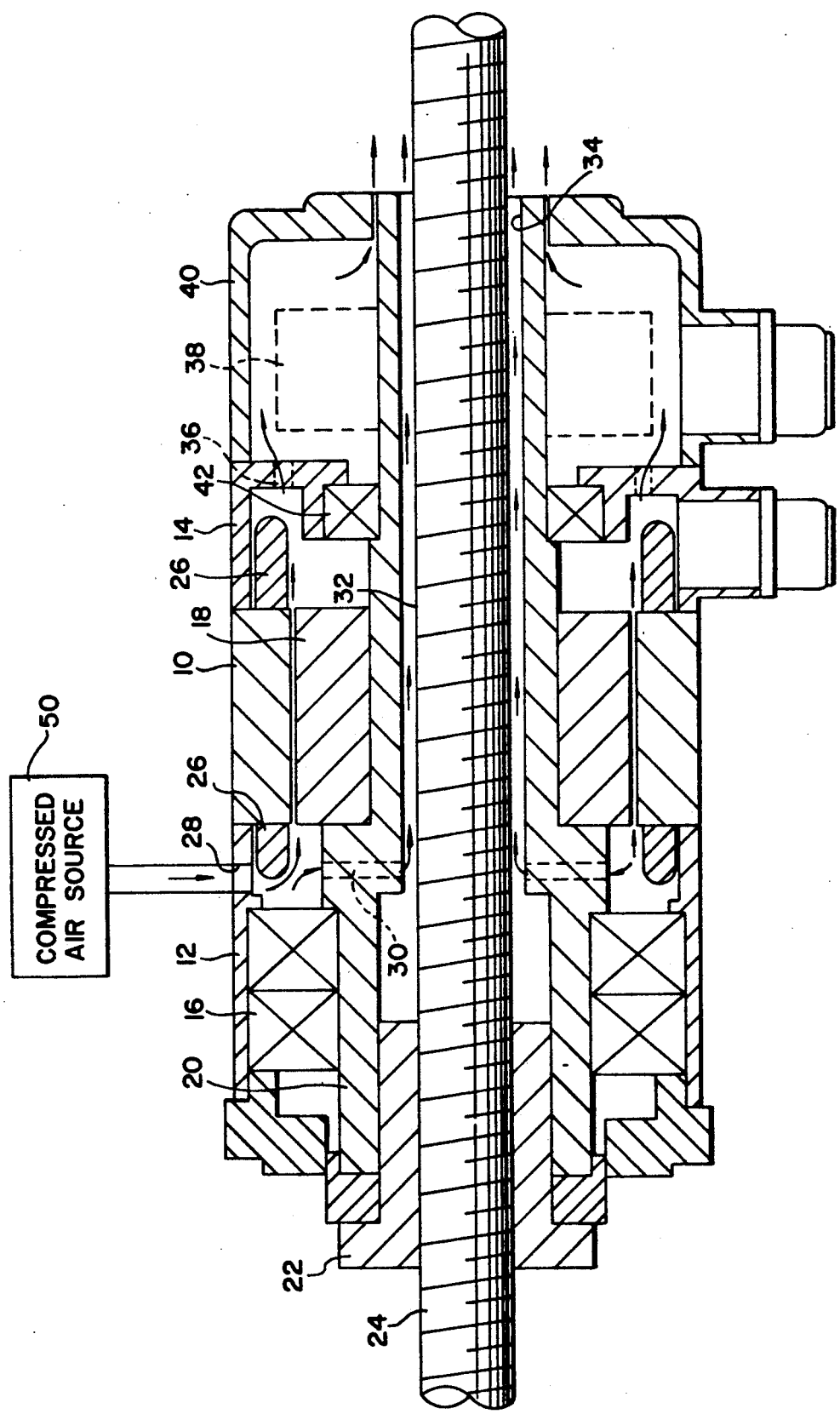
FIG. 1 is a longitudinal sectional view of a hollow shaft motor according to the present invention.

Below, the present invention will be explained in further detail based on the embodiment shown in the attached drawing. In the front and back of a stator having a winding 26 are provided a front housing 12 and a rear housing 14. These housings 12 and 14 support in a rotatable fashion a cylindrical shaft 20 provided with a bore 32 through a front bearing 16 and a rear bearing 42. At the front end of the cylindrical shaft 20 is fixed a ball nut 22. A ball screw shaft 24 screwed together with the nut 22 passes through the bore 32 of the cylindrical shaft 20. Further, a rotor 18 is fixed to the outer circumference of the cylindrical shaft 20 at a position opposing the stator 10.

The front housing 12 is provided with an introducing hole 28 for introducing compressed air, as a cooling gas, at a position between the stator 10 and the front bearing 16 where the end of the winding 26 is located. Further, a suitable number of other radial direction introducing holes 30 are disposed in the cylindrical shaft 20 in the circumferential direction of the same at a position between the rotor 18 and the front bearing 16. The rear end wall of the rear housing 14 is provided with a suitable number of holes 36 to connect the inside of a detector housing 40 accommodating a rear detector 38 and the inside of the motor. The detector housing 40 and cylindrical shaft 20 have between them a slight clearance at the rear portion.

With the above construction, when compressed air is introduced into the inside of the motor from an external compressed air source 50 through the introducing hole 28, the winding 26 and the rear of the stator 10, which are heat generating sources, are cooled. Further, part of the compressed air cools one end of the rotor 18, another heat generating source, and flows in the clearance between the rotor 18 and stator 10 to flow out into the rear housing 14. The compressed air flowing out into the rear housing 14 in this way cools the other end of the winding 26, the stator 10, the rear ends of the stator 10 and rotor 18, and further the rear bearing 42 and while doing so passes through a hole 36 to flow into the detector housing 40 and is blown out strongly from the slight clearance between the detector housing 40 and cylindrical shaft 20. Therefore, it is possible to prevent entry of dust from the outside into the inside of the motor and the detector housing 40. Before this, naturally, the compressed air introduced into the motor from the compressed air source is passed through a filter to be cleaned.

On the other hand, part of the compressed air introduced from the above-mentioned introducing hole 28 to the front housing 12 cools the end of the front bearing 16 and flows from the other introducing holes 30 provided in the radial direction into the bore 32 of the cylindrical shaft 20 against the centrifugal force caused by rotation of the cylindrical shaft 20 by the action of its pressure. The cylindrical shaft 20 is closed by the ball nut 22, so the compressed air flowing into the bore 32 flows to the rear through the annular clearance formed by the cylindrical shaft 20 and the ball screw shaft 24 and flows out from the rear opening 34 of the cylindrical shaft 20 to the outside. During this time, the ball screw shaft 24 and cylindrical shaft 20 are subjected to the cooling action of the flow of the compressed air.

In the above way, the cooling compressed air directly cools the inside of the motor, the component elements, and the ball screw shaft 24 and indirectly prevents heat generated by the inside of the motor from being conducted to the ball nut 22, so it is possible to prevent a rise in the temperature of the two members of the ball screw shaft 24 and ball nut 22. In the above embodiment, the ball nut 22 is provided at the front end of the motor, but it may also be provided at the rear end and compressed air may be introduced from the rear housing 14.

As clear from the above explanation, according to the present invention, the ball screw shaft and ball nut are efficiently cooled to suppress heat expansion, whereby it becomes possible to provide a hollow shaft motor which can drive a driven body with a good precision.

We claim:

1. A hollow shaft motor which includes a ball nut for driving a ball screw shaft extending through a through-bore of the hollow shaft, comprising:
   a housing;
   a hollow shaft rotatably mounted internally of said housing;
   a stator fixed to said housing;
   a rotor fixed to an outer surface of said hollow shaft opposite said stator;
   a ball nut fixed to said hollow shaft for rotation with said hollow shaft, said ball nut being located at one end of said housing for threaded engagement with a ball screw shaft extending through said hollow shaft;
   an annular space internal of said housing and located between said stator and said one end of said housing;
   a first hole formed radially through said housing and providing fluid communication with said annular space;
   at least one second hole through said hollow shaft and providing fluid communication between said annular space and said through-bore of said hollow shaft; and
   exhaust openings located on a side of said stator opposite from said annular space, whereby pressurized cooling fluid introduced through said first hole to said annular space flows past said stator and rotor and between said ball screw shaft and said through-bore of said hollow shaft to said exhaust openings.

2. A hollow shaft motor according to claim 1 and further comprising: a source of compressed cooling fluid and means for delivering pressurized cooling fluid from said source to said first hole.

3. A hollow shaft motor according to claim 2, wherein said source of compressed cooling fluid is a source of compressed air.

4. A hollow shaft motor according to claim 1, wherein said first hole formed radially through said housing is located at a position adjacent to one longitudinal end of a winding wound about said stator.

5. A hollow shaft motor according to claim 1, wherein at least one of said exhaust openings located on a side of said stator opposite from said annular space is at least one third hole having a small cross-sectional area and located at an end of said housing opposite from said ball nut, said third hole being provided for allowing said pressurized cooling fluid to be exhausted after cooling said stator.

6. A hollow shaft motor according to claim 1, wherein one of said exhaust openings is located at an end of said hollow shaft opposite from said ball nut and comprises an end opening between the through-bore of said hollow shaft and said ball screw shaft, whereby said pressurized cooling fluid introduced into said through-bore of said hollow shaft to cool said ball-screw shaft flows out of said opening at said end of said hollow shaft opposite from said ball screw.

* * * * *